United States Patent
Shu et al.

(10) Patent No.: US 11,863,525 B2
(45) Date of Patent: Jan. 2, 2024

(54) CONTACT PASSLISTING ACROSS DIGITAL CHANNELS

(71) Applicant: salesforce.com, inc., San Francisco, CA (US)

(72) Inventors: Gang Shu, South San Francisco, CA (US); John Huang, Dublin, CA (US); Jia Le Chen, San Francisco, CA (US); David Aden, Largo, FL (US); Xiaozhong Sun, Fremont, CA (US); Jong Lee, Pleasanton, CA (US)

(73) Assignee: Salesforce, Inc., San Francisco, CA (US)

( * ) Notice: Subject to any disclaimer, the term of this patent is extended or adjusted under 35 U.S.C. 154(b) by 35 days.

(21) Appl. No.: 17/162,821

(22) Filed: Jan. 29, 2021

(65) Prior Publication Data
US 2022/0247724 A1     Aug. 4, 2022

(51) Int. Cl.
| | |
|---|---|
| *H04M 3/00* | (2006.01) |
| *H04L 9/40* | (2022.01) |
| *G06Q 30/02* | (2023.01) |
| *H04M 3/51* | (2006.01) |
| *H04M 3/523* | (2006.01) |

(52) U.S. Cl.
CPC ..... *H04L 63/0227* (2013.01); *G06Q 30/0281* (2013.01); *H04L 63/0892* (2013.01); *H04M 3/5191* (2013.01); *H04M 3/523* (2013.01); *H04M 3/5238* (2013.01)

(58) Field of Classification Search
CPC ....... H04L 63/002727; G06Q 30/0281; H04M 63/0892; H04M 3/5191

USPC ....... 379/265.01–265.14, 266.01–266.1, 309
See application file for complete search history.

(56) References Cited

U.S. PATENT DOCUMENTS

| | | | |
|---|---|---|---|
| 11,451,667 B1* | 9/2022 | Chau | H04M 7/0045 |
| 2004/0078447 A1* | 4/2004 | Malik | G06Q 10/107 |
| | | | 709/206 |
| 2006/0206713 A1* | 9/2006 | Hickman | H04L 51/212 |
| | | | 713/176 |
| 2007/0156886 A1* | 7/2007 | Srivastava | G06Q 10/109 |
| | | | 709/224 |
| 2011/0010638 A1* | 1/2011 | Fox | G06F 16/489 |
| | | | 715/752 |
| 2012/0246725 A1* | 9/2012 | Osipkov | G06F 21/572 |
| | | | 715/752 |

(Continued)

*Primary Examiner* — William J Deane, Jr.
(74) *Attorney, Agent, or Firm* — Sterne, Kessler, Goldstein & Fox P.L.L.C.

(57) ABSTRACT

Disclosed herein are system, method, and computer program product embodiments for capturing incoming communications from a sender across multiple channels, and determining whether to include those communications from the sender in an inbox using a waiting room. The waiting room lists unknown senders, and allows a user to add the senders to a blocklist, where the sender's communications are omitted from the user's inbox, or to a passlist, where a new CRM customer record is created for the sender. With the CRM customer record created, future communications from the sender are matched to the CRM customer record and permitted for inclusion in an inbox. This way, recipients can prioritize customers (or other high-value communications) within their inbox based on a corresponding existing CRM customer record, while simplifying the capture of those CRM customer records.

20 Claims, 7 Drawing Sheets

(56) References Cited

U.S. PATENT DOCUMENTS

2021/0209536 A1* 7/2021 Reuveni .......... G06Q 10/06316
2022/0247972 A1* 8/2022 Chau ..................... G06Q 30/01

* cited by examiner

CONTACT PASSLISTING ACROSS DIGITAL CHANNELS

BACKGROUND

When operating in a busy communication environment, such as a sales or service environment, ensuring that critical communications from customers or potential customers are received an acted on quickly is a top priority. This challenge is complicated by the myriad ways in which customers or potential customers can reach businesses today, and missing a contact can mean a costly loss of business.

Accordingly, approaches are needed to improve access to customer and potential customer communications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for managing contact passlists and blocklists across multiple communication channels using customer relationship management (CRM) tools.

Traditionally, CRM implementations have been built around customers as records, with the goal of gathering up and storing these contacts in furtherance of business goals (e.g., as leads for future business). However, this approach runs the risk of burying important customer and potential customer communications. These communications, if promptly addressed, could result in converting new or additional business.

However, in a high traffic environment for communications such as sales or service, ensuring that communications from customers or potential customers are promptly reviewed and addressed is not necessarily a straightforward task. And while some tools have been developed in the context of email communications to prioritize certain emails, these tools lack functionality that allows for CRM integration and cross-channel communications.

Figure 1:
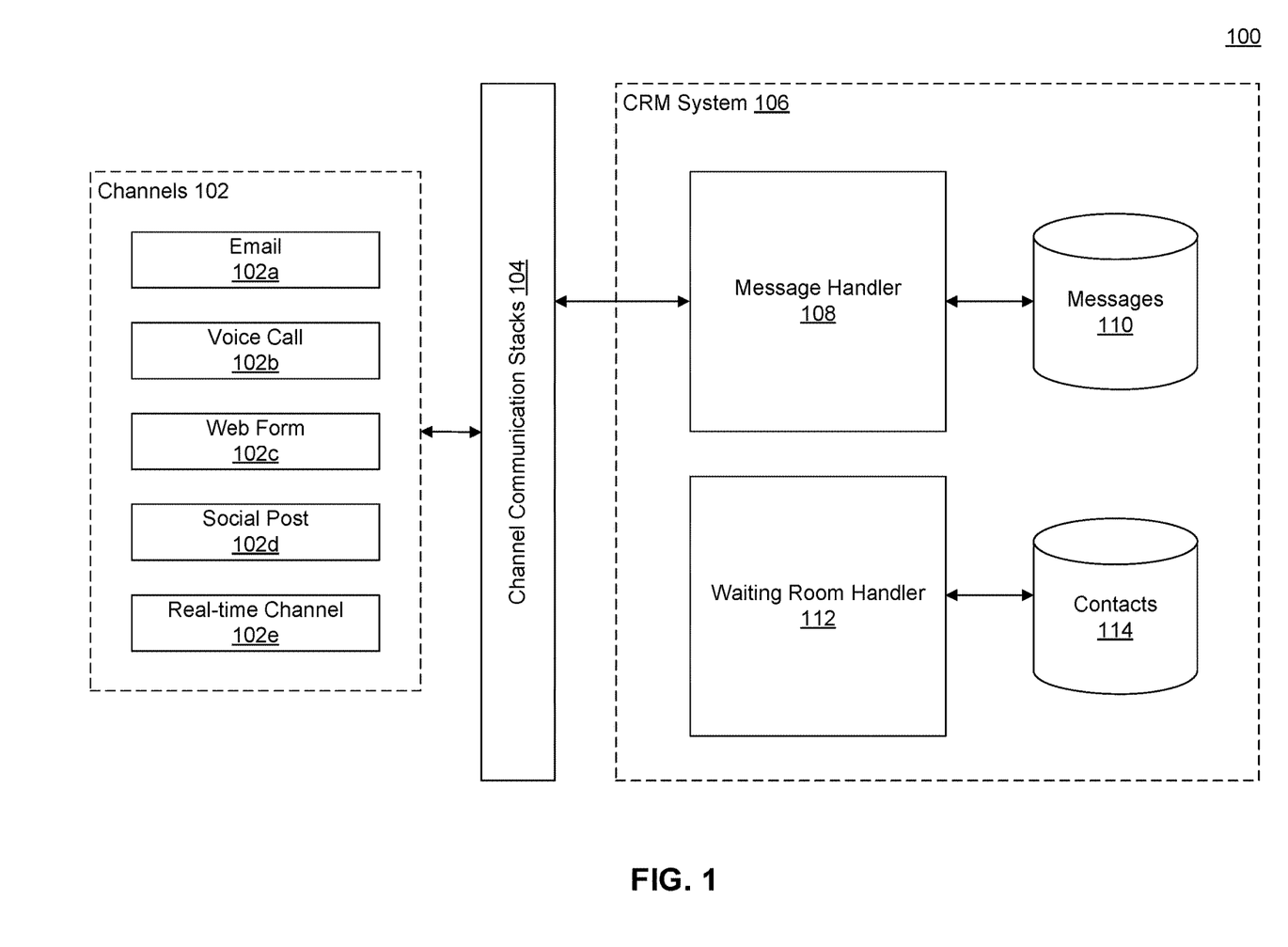
FIG. 1 illustrates a communication architecture, in accordance with an embodiment.

FIG. 1 illustrates a communication architecture 100, in accordance with an embodiment. Various communication channels 102 are provided by which customers or potential customers may reach out to a business (e.g., via contact with sales or service relationship managers). These include, by way of non-limiting example, emails 102a, voice calls 102b, web forms 102c, social postings 102d (e.g., communications via social media platforms such as Facebook, Twitter, YouTube, Instagram, LinkedIn, Google+, Sina Weibo, etc.), and real-time channels 102e (e.g., live agent chats, SMS, Facebook messages, WhatsApp, WeChat, Apple Business Chat, etc.).

Channel communication stacks 104 provide software code configured to interface with each of channels 102 as necessary (e.g., via an application programming interface (API) for the channel). Channel communication stacks 104 are configured to read a variety of data fields for each type of communication (often unique to each channel 102) and provide them to message handler 108 of CRM system 106. Channel communication stacks 104 are connected during operation to each communication channel 102 source, such as an email server, social media API, or SMS service, by way of non-limiting example. Table 1 below illustrates example information that can be captured for an incoming communication by a possible contact for different channels 102, in addition to the incoming communication itself:

TABLE 1

| Channel Type | Information Captured for a Contact |
|---|---|
| Email | Email address, last/first names, title/company from user signature |
| Social media posting | User name, user avatar |
| Facebook Messenger | User name, user avatar |
| WeChat | User name, user avatar |
| Phone call | Phone number |
| Text (SMS) | Phone number |
| WhatsApp | Phone number, profile names, user avatar |

One skilled in the relevant arts will recognize that these exemplary information fields for channels 102 are not limiting, and that additional information can be captured from a variety of channels 102 (e.g., header information) or derived (e.g., information in a signature block) from the communication itself.

With this information about the contact and the communication provided to message handler 108, a message associated with the communication can be stored to messages 110. With messages 110, it is possible for a message reader (e.g., an email inbox application) to read messages 110 and present them for display to an end user.

Waiting room handler 112 is able to receive the incoming communication and the captured information for the contact into a "waiting room," from which it can be determined whether the contact should be added to a passlist or a blocklist, by way of non-limiting example. These contacts can be stored as contacts 114 in CRM system 106, either separately or together as needed. In one embodiment, contacts added to the passlist are added as CRM customer records, and a separate blocklist is maintained. A blocklist may also be termed an ignore list, or other similar name, referencing that communications from contacts added to the block list are omitted (ignored, or blocked).

As illustrated further below, a messaging application (e.g., email client, or other message viewer) can cross-reference the CRM customer records of contacts 114 and messages 110 in order to prioritize messages 110 that are from CRM customer records in contacts 114. For example, messages 110 may be prioritized by only displaying those messages that are from customers with CRM customer records in contacts 114.

In effect, when a contact communicates across any channel 102, their messages (from messages 110) are shown in the recipient's view of the messages (such as an inbox) if the contact has an established corresponding CRM customer record in contacts 114. However, if the contact is not an existing contact, they are put into a "waiting room" by waiting room handler 112, where the contact can be approved (passlisted) or skipped (blocklisted). When the contact is either approved or skipped, it is removed from the waiting room and handled as passlisted or blocklisted. When passlisted, a CRM customer record is created for them so that future communications across any channel from that contact (for which there is a match) is automatically permitted. As a result, users (e.g., sales and support relationship managers) can enjoy an inbox view (either for individual channels 102a-e or a unified inbox across channels 102) that shows only communications from passlisted contacts that are high value (i.e., they have corresponding CRM customer records in contacts 114). When blocklisted, the contact is placed in the blocklist where communications from that contact are not delivered to the inbox.

Figure 2:
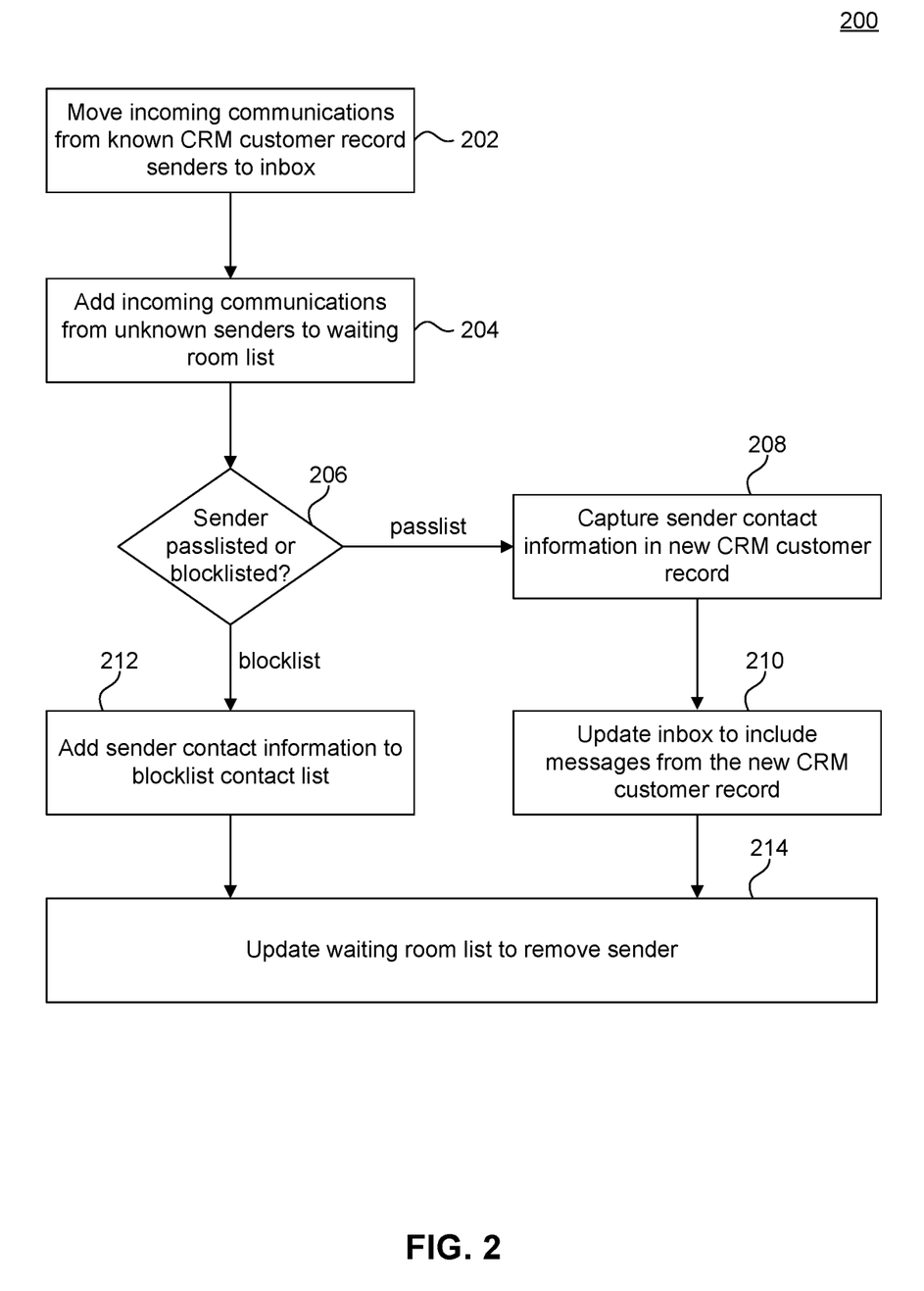
FIG. 2 is a flowchart illustrating steps by which a waiting room handler handles communications from senders, in accordance with an embodiment.

FIG. 2 is a flowchart 200 illustrating steps by which a waiting room handler, such as waiting room handler 112 of FIG. 1, handles communications from senders, in accordance with an embodiment. Initially, if an incoming communication is from a sender that has a matching CRM customer record, the incoming communication is passed along directly to the inbox at step 202. This can be handled by, for example, cross referencing the incoming communication with a list of CRM customer records and only showing those communications that have such correspondence to an existing CRM customer record. In another example, the incoming communications may be included in an approved list only if the sender matches a CRM customer record. One skilled in the relevant arts will appreciate that the manner in which the sender is verified against the CRM customer records may vary by application, and these approaches are non-limiting.

In the case of incoming communications from an unknown sender, the communication is added to a waiting room list at step 204. A user may display the waiting room list from which they may select whether to pass or block a given sender. The waiting room handler determines, at step 206, whether the sender has been passlisted or blocklisted. If the sender is passlisted (e.g., by a user clicking a checkmark or thumbs-up symbol within the waiting room list display), the sender contact information is captured in a new CRM customer record at step 208, and the inbox is updated to include communications (such as the incoming communication) from the new CRM customer record at step 210. The sender is then removed from the waiting room list at step 214.

Alternatively, if the sender is blocklisted (e.g., by a user clicking an 'X' or thumbs-down symbol within the waiting room list display) at step 206, the sender contact information is added to a blocklist contact list at step 212. And, here as well, the sender is then removed from the waiting room list at step 214.

With a sender passlisted following steps 206, 208, and 210, the new CRM customer record that is created for the sender simplifies further communication with that sender. In the event that an additional communication is received from that sender, it is matched to the CRM customer record at a further iteration of step 202 and automatically placed in the inbox. If the additional communication is received via a different channel from the original communication, overlapping information from Table 1 that is present in the CRM customer record can be used to determine that the new sender is the same as the previous sender for which the CRM customer record was created.

For example, if the original communication that was passlisted and used to create the new CRM customer record was an email, a cell phone number might be retrieved from the sender's signature block in the email and included in the new CRM customer record. Subsequently, if a communication is received via SMS from that number, the SMS communication can be automatically moved to the inbox at step 202 based on the association with the CRM customer record bearing that number (as previously obtained from the email signature block).

Figure 3:
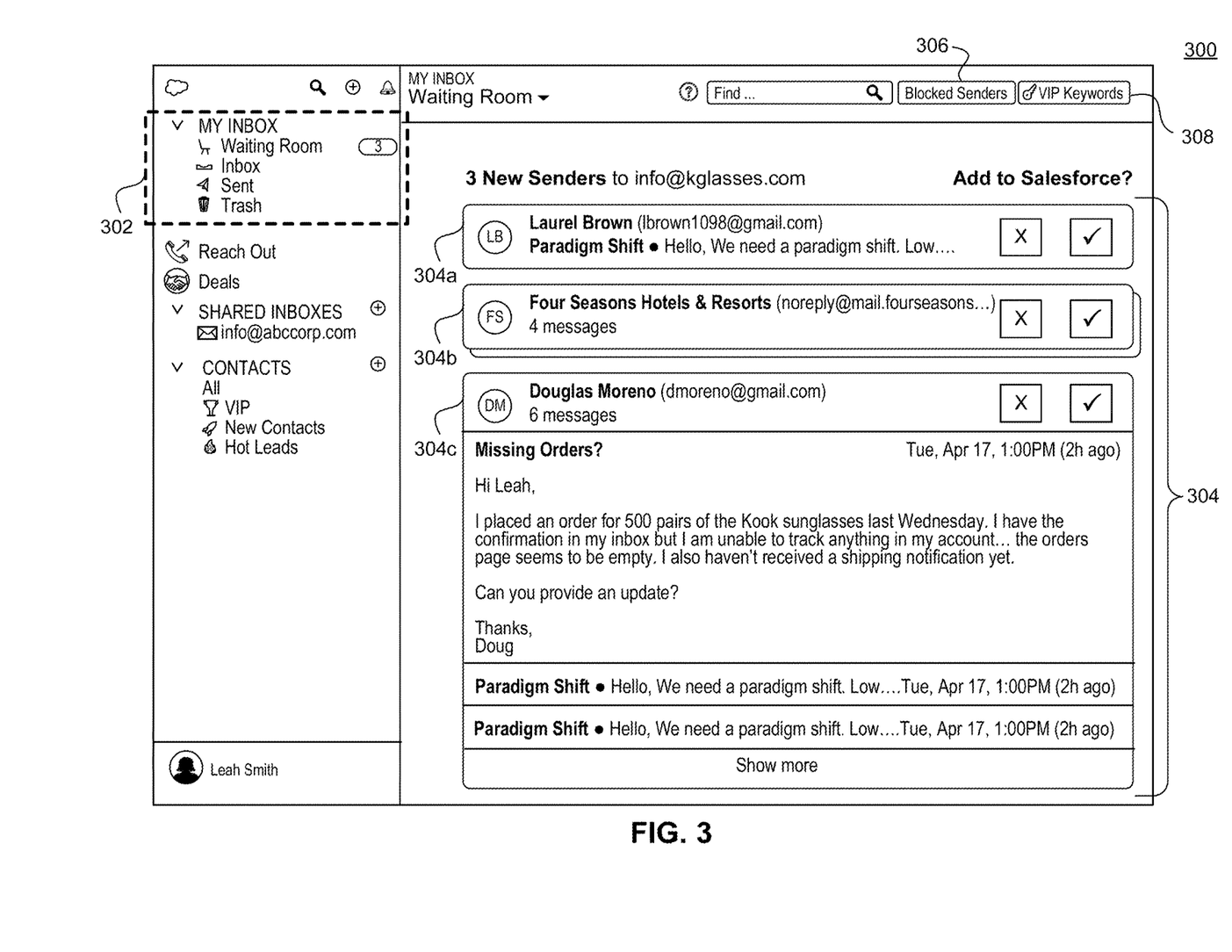
FIG. 3 is a user interface for a waiting room, in accordance with an embodiment.

When a communication is placed in the waiting room, a user may call up a user interface (UI) to view unknown senders and their communication, and passlist or blocklist the individual senders, as discussed above. FIG. 3 is a user interface 300 for a waiting room, in accordance with an embodiment. In an embodiment, a side panel 302 for a communication channel (corresponding to, e.g., email 102a of FIG. 1) includes a link to a waiting room for that channel, and one or more message folders for viewing communications (e.g., inbox, sent, trash, etc.).

In the example UI 300, waiting room list display 304 is shown, containing communications 304 a, 304 b, and 304 c which have been received for the given channel. One skilled in the relevant arts will appreciate that a unified channel waiting room can be shown instead, with communications 304 a-c being drawn from across multiple channels 102 of FIG. 1.

For a given communication, such as communication 304c, UI 300 shows information useful for the purpose of determining whether to passlist or blocklist the given sender. The information shown varies depending on the channel from which the message was received, and can include information such as shown in Table 1 above. In the example of 304c, the sender's name and email address is shown, sourced from an email communication corresponding to communication 304c. Additionally, a user of UI 300 may optionally expand an interface element corresponding to communication 304c in order to view the underlying communication (e.g., an email message).

Upon reviewing the information for a given communication 304a-c, the user may then select whether to passlist or blocklist the sender by clicking the checkmark (or other similar interface element, e.g., a thumbs up) to passlist the sender (corresponding to, e.g., elements 206, 208, and 210 of FIG. 2), or clicking the 'X' (or other similar interface element, e.g., a thumbs down) to blocklist the sender (corresponding to, e.g., elements 206 and 212 of FIG. 2).

UI 300 additionally includes access to a blocked senders list 306, in accordance with an embodiment. In exemplary UI 300, a button is used to invoke blocked senders list 306, and when selected can display an additional UI element listing all senders that have been blocklisted. From there, a user may select blocked senders for removal (unblocklisting) from the blocked senders list, which would add the senders to the passlist. In accordance with an embodiment, the addition of a sender to the passlist is done by creating a new CRM customer record corresponding to the contact (i.e., the passlist is the inclusion of the contact in the CRM customer record set). Further details are discussed below with respect to FIG. 5.

UI 300 also includes filter options 308 (illustrated as "VIP keywords"), in accordance with an embodiment. In exemplary UI 300, a button is used to invoke a menu in which keywords can be entered to allow matching communications to be automatically passlisted. One skilled in the relevant arts will appreciate that other filtering criteria can be provided and used to automatically passlist communications. Further details are discussed below with respect to FIG. 6.

Figure 4:
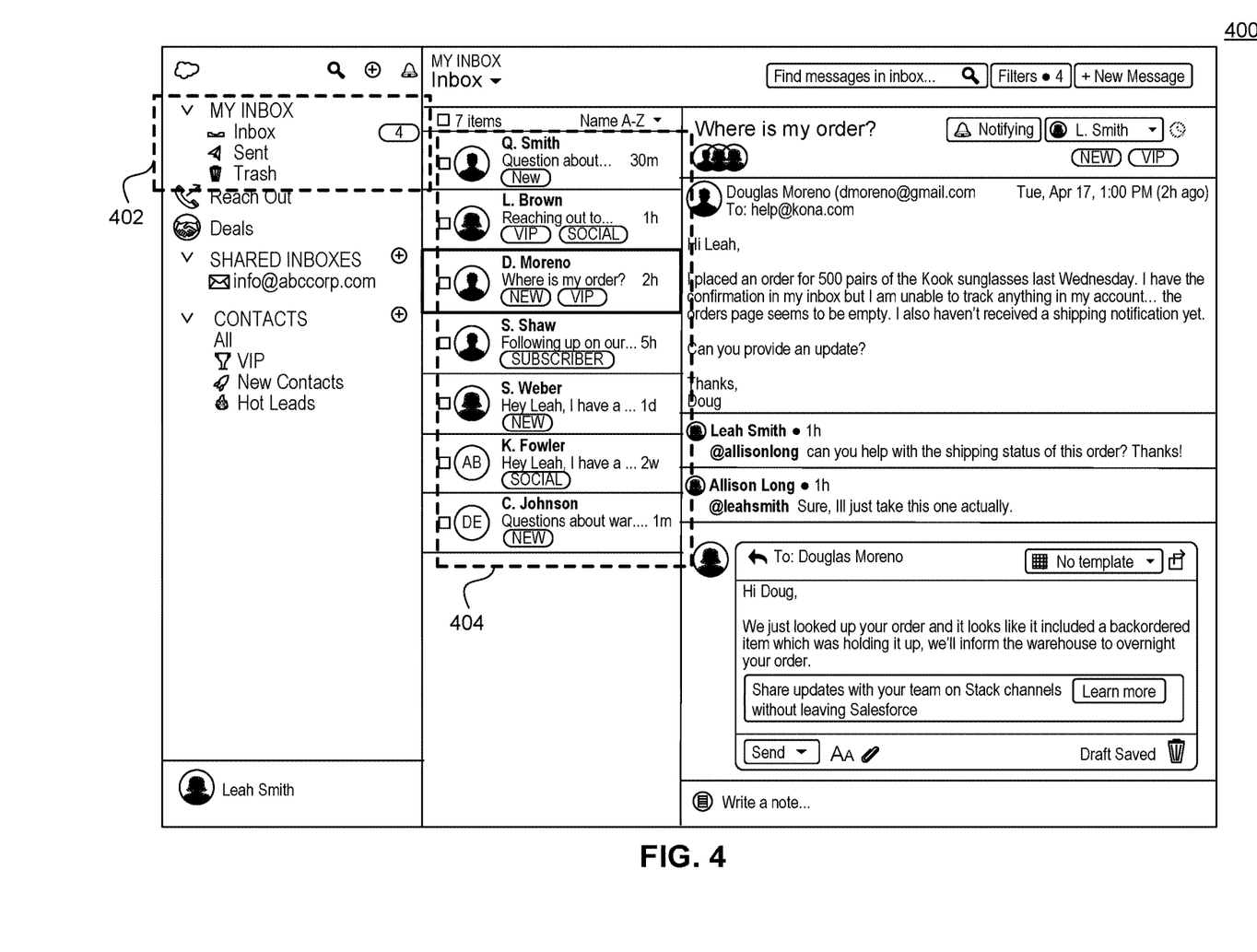
FIG. 4 is a user interface for an inbox, in accordance with an embodiment.

FIG. 4 is a user interface 400 for an inbox, in accordance with an embodiment. As shown in UI 400, a side bar 402 allows for the selection of various folders (e.g., inbox, sent, trash) associated with a communication channel 102 of FIG. 1. Additionally, side bar may allow for the selection of a "unified" inbox that shows received communications across all channels 102, in accordance with an embodiment.

UI 400 includes a communication list 404, which shows available communications. The communications depicted in communication list 404 are each passlisted, and correspond to a CRM customer record within an underlying CRM system such as CRM system 106 of FIG. 1. In an embodiment, any communications received from a sender that does not correspond to a CRM customer record is omitted from communication list 404.

When a communication is selected from communication list 404, a copy of the communication is shown in UI 400 for the purpose of reading the communication, responding to the communication, reading related communications (e.g., a threaded view), and carrying out other functions related to the selected communication.

Figure 5:
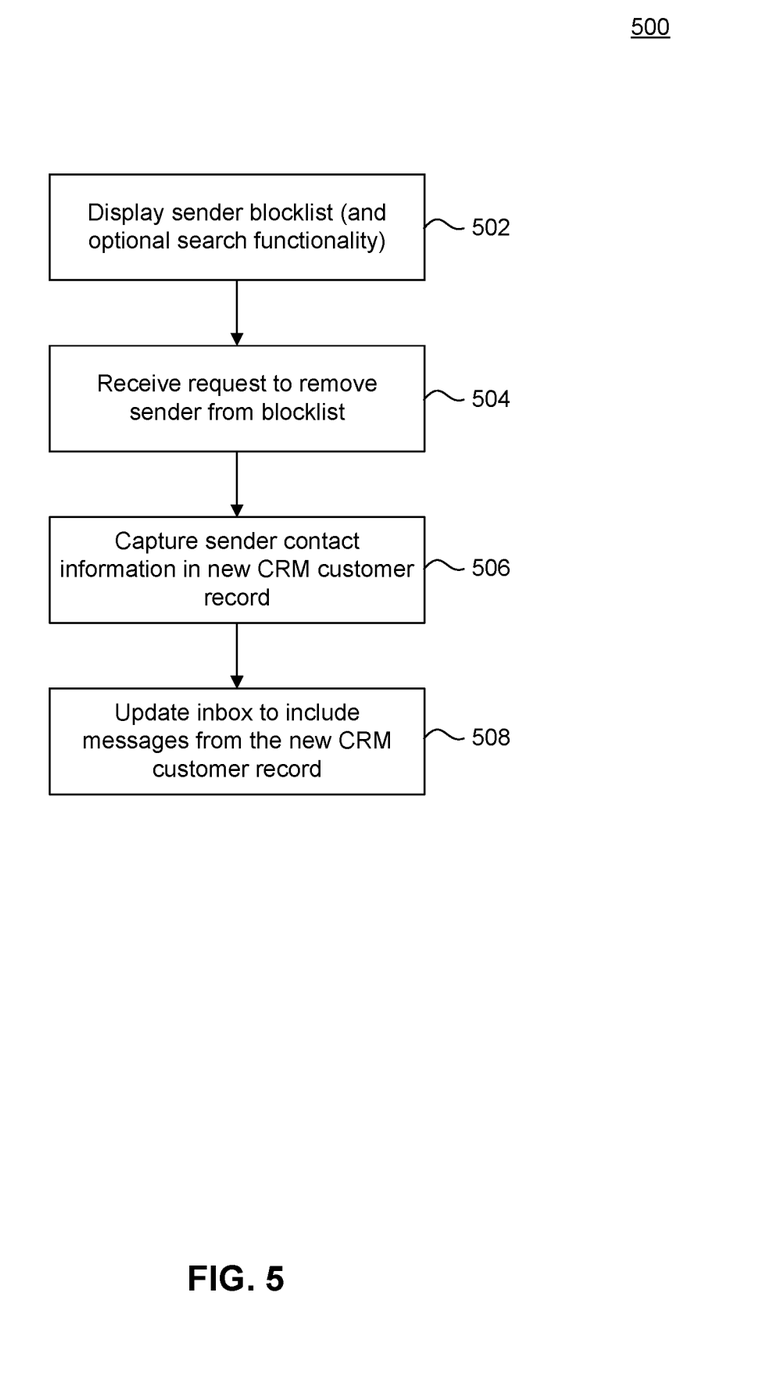
FIG. 5 is a flowchart illustrating steps by which a contact may be removed from a sender blocklist, in accordance with an embodiment.

FIG. 5 is a flowchart 500 illustrating steps by which a contact may be removed from a sender blocklist, in accordance with an embodiment. As previously described, a user may call the functionality of flowchart 500 by requesting to view the sender blocklist, such as by the button corresponding to block senders list 306 of FIG. 3.

In response, the sender blocklist is displayed at step 502. This blocklist includes all senders that have been previously blocklisted such as, e.g., by the process described in FIG. 2 at elements 206 and 212. One skilled in the relevant art will appreciate that this list can be reviewed by a number of mechanisms, including by sorting the senders on any available field. Additionally, as shown at step 502, a search function may be displayed to allow a user to search through the blocklist.

If a user selects a sender from the blocklist for removal, such request is received at step 504. Consequently, at step 506, the sender is passlisted and thereby a corresponding new CRM customer record for the sender is created. At step 508, the inbox is updated to include any communications corresponding to this new CRM customer record, consistent with passlisting as in steps 206, 208, and 210 of FIG. 2.

While in the foregoing approach removing the sender from the blocklist includes adding the sender to the passlist, alternative approaches may be included. For example, in an alternative embodiment, the sender may be removed from the blocklist and instead added back to the waiting room list. From here, the user may return to the waiting room UI and passlist or blocklist the sender as per usual (e.g., step 206 of FIG. 2). However, by automatically adding the sender to the passlist upon removal from the blocklist, this step can be saved.

Figure 6:
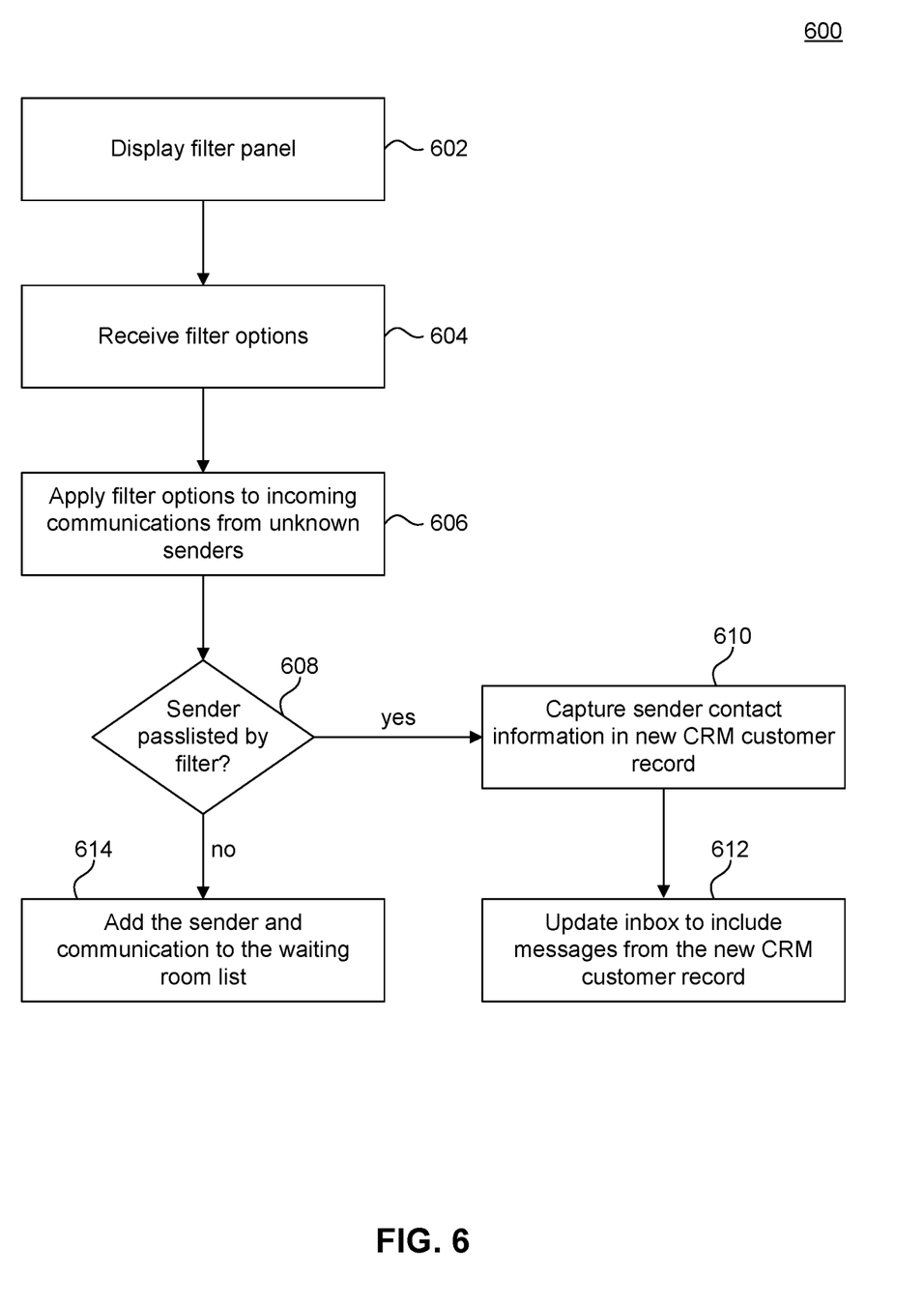
FIG. 6 is a flowchart illustrating steps by which a contact may be passlisted using a filter, in accordance with an embodiment.

As previously discussed with reference to button 308 of FIG. 3, adding a sender to the passlist can be automated by using, for example, filters. FIG. 6 is a flowchart 600 illustrating steps by which a contact may be passlisted using a filter, in accordance with an embodiment. One skilled in the relevant arts will appreciate that a filter may include any approach that allows for automatically matching a communication from a sender to filter criteria for the purpose of passlisting, such as, for example, rule-based processing, keyword matching, or even machine learning (ML) approaches.

A filter panel is displayed at step 602 that allows a user the option to configure filters (e.g., rules, keywords, ML parameters, etc.). Regardless of how the filter is implemented, these options are received at step 604 and applied to incoming communications at step 606.

One skilled in the relevant arts will appreciate that filters may also be applied to automatically blocklist a sender, using a similar mechanic to that described here. However, since in the exemplary embodiment communications are only shown for passlisted senders, flowchart 600 automates only the inclusion of senders in the passlist.

Therefore, at step 608, a determination is made as to whether the sender is passlisted or not. If the sender is not passlisted, then at step 614 the sender is added to the waiting room list. From here, the waiting room list approach of flowchart 200 of FIG. 2 can be used to passlist or blocklist the sender from step 206 of FIG. 2.

If the filter automatically passlists the sender, then the sender contact information is captured into a new CRM customer record at step 610 and the inbox is updated to include communications corresponding to the new CRM customer record at step 612 (corresponding to passlisting as in steps 206, 208, and 210 of FIG. 2.

Figure 7:
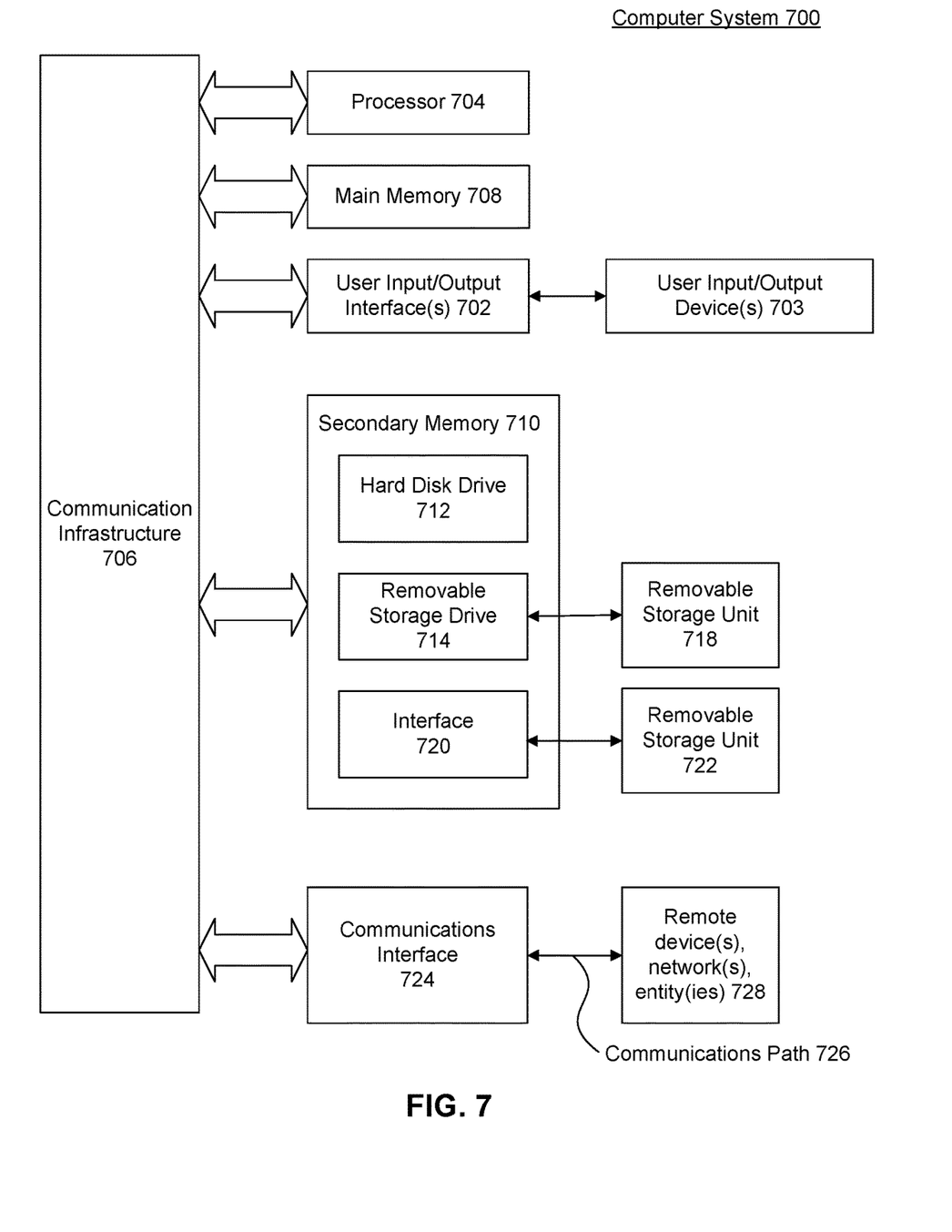
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include customer input/output device(s) 703, such as monitors, keyboards, pointing devices, etc., which may communicate with communication infrastructure 706 through customer input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodi-

What is claimed is:

1. A method, comprising:
placing, by one or more computing devices, a contact in a waiting room list responsive to receipt of a communication from the contact via a communication channel;
creating, by the one or more computing devices, a new customer record responsive to a passlist selection of the contact from the waiting room list, the new customer record including information captured for the contact from the communication channel; and
updating, by the one or more computing devices, a filtered communication inbox to include the communication based at least in part on the contact's correspondence to the new customer record.

2. The method of claim 1, further comprising:
updating, by the one or more computing devices, the waiting room list to remove the contact responsive to the passlist selection of the contact from the waiting room list.

3. The method of claim 1, further comprising:
receiving, by the one or more computing devices, an additional communication from an additional contact via the communication channel;
placing, by the one or more computing devices, the additional contact in the waiting room list; and
adding, by the one or more computing devices, contact information of the additional contact to a blocklist contact list responsive to a blocklist selection of the additional contact from the waiting room list.

4. The method of claim 3, further comprising:
creating, by the one or more computing devices, an additional new customer record for the additional contact responsive to a request to remove the additional contact from the blocklist contact list.

5. The method of claim 1, further comprising:
applying, by the one or more computing devices, a filter to the communication from the contact, wherein the placing is based at least in part on the contact not being associated with an existing customer record.

6. The method of claim 1, further comprising:
receiving, by the one or more computing devices, an additional communication from an additional contact via the communication channel;
applying, by the one or more computing devices, a filter to the additional communication from the additional contact; and
creating, by the one or more computing devices, an additional new customer record for the additional contact responsive to a passlist selection of the additional contact by the filter, the additional new customer record including information captured for the additional contact from the communication channel.

7. The method of claim 1, further comprising:
connecting, by the one or more computing devices, channel communication stacks to a plurality of communication channels comprising the communication channel.

8. A system comprising:
a memory configured to store operations; and
one or more processors configured to perform the operations, the operations comprising:
placing a contact in a waiting room list responsive to receipt of a communication from the contact via a communication channel,
creating a new customer record responsive to a passlist selection of the contact from the waiting room list, the new customer record including information captured for the contact from the communication channel, and
updating a filtered communication inbox to include the communication based at least in part on the contact's correspondence to the new customer record.

9. The system of claim 8, the operations further comprising:
updating the waiting room list to remove the contact responsive to the passlist selection of the contact from the waiting room list.

10. The system of claim 8, the operations further comprising:
receiving an additional communication from an additional contact via the communication channel,
placing the additional contact in the waiting room list, and
adding contact information of the additional contact to a blocklist contact list responsive to a blocklist selection of the additional contact from the waiting room list.

11. The system of claim 10, the operations further comprising:
creating an additional new customer record for the additional contact responsive to a request to remove the additional contact from the blocklist contact list.

12. The system of claim 8, the operations further comprising:
applying a filter to the communication from the contact, wherein the placing is based at least in part on the contact not being associated with an existing customer record.

13. The system of claim 8, the operations further comprising:
receiving an additional communication from an additional contact via the communication channel,
applying a filter to the additional communication from the additional contact, and
creating an additional new customer record for the additional contact responsive to a passlist selection of the additional contact by the filter, the additional new customer record including information captured for the additional contact from the communication channel.

14. The system of claim 8, the operations further comprising:
connecting channel communication stacks to a plurality of communication channels comprising the communication channel.

15. A computer readable storage device having instructions stored thereon, execution of which, by one or more processing devices, cause the one or more processing devices to perform operations comprising:
placing the a contact in a waiting room list;
creating a new customer record responsive to a passlist selection of the contact from the waiting room list, the new customer record including information captured for the contact from a communication channel; and
updating a filtered communication inbox to include a communication based at least in part on the contact's correspondence to the new customer record.

16. The computer readable storage device of claim 15, the operations further comprising:
updating the waiting room list to remove the contact responsive to the passlist selection of the contact from the waiting room list.

17. The computer readable storage device of claim 15, the operations further comprising:
- receiving an additional communication from an additional contact via the communication channel;
- placing the additional contact in the waiting room list; and
- adding contact information of the additional contact to a blocklist contact list responsive to a blocklist selection of the additional contact from the waiting room list.

18. The computer readable storage device of claim 17, the operations further comprising:
- creating an additional new customer record for the additional contact responsive to a request to remove the additional contact from the blocklist contact list.

19. The computer readable storage device of claim 15, the operations further comprising:
- applying a filter to a communication from the contact, wherein the placing is based at least in part on the contact not being associated with an existing customer record.

20. The computer readable storage device of claim 15, the operations further comprising:
- receiving an additional communication from an additional contact via the communication channel;
- applying a filter to the additional communication from the additional contact; and
- creating an additional new customer record for the additional contact responsive to a passlist selection of the additional contact by the filter, the additional new customer record including information captured for the additional contact from the communication channel.

* * * * *